United States Patent [19]

Baker et al.

[11] 4,310,946

[45] Jan. 19, 1982

[54] ELECTROMAGNETIC ENERGY-CARRYING TUBE AND FABRICATION METHOD THEREFOR, AND THE COMBINATION THEREOF WITH SUCTION CLEANING APPARATUS

[75] Inventors: John C. Baker, Huntington Beach; Richard O. Finley, Redondo Beach; David A. Stanwood, West Covina; Robert C. Bryson, Torrance, all of Calif.

[73] Assignee: Plastiflex Company International, Fountain Valley, Calif.

[21] Appl. No.: 19,454

[22] Filed: Mar. 12, 1979

Related U.S. Application Data

[63] Continuation-in-part of Ser. No. 4,695, Jan. 19, 1979, abandoned.

[51] Int. Cl.³ ............... A47L 9/24; F16L 11/12; F16L 11/16; B29D 23/12
[52] U.S. Cl. ............................ 15/363; 15/377; 138/122; 138/129; 138/154; 156/143; 156/195; 174/47
[58] Field of Search ............ 174/47; 138/103, 122, 138/129, 133, 135, 136, 154; 156/143, 144, 195; 15/327 R, 327 D, 327 E, 377, 363

[56] References Cited

U.S. PATENT DOCUMENTS 2,695,631 11/1954 Seck ........................ 138/122
3,255,780 6/1966 Squirrell ...................... 138/122
3,679,531 7/1972 Wienand et al. ............ 138/154 X
3,965,526 6/1976 Doubleday .................. 174/47 X
4,167,645 9/1979 Carey .......................... 174/47
4,203,476 5/1980 Vitellaro ...................... 138/122
4,209,043 6/1980 Menzel ........................ 138/154
4,224,965 9/1980 Suchor ........................ 138/129 X

FOREIGN PATENT DOCUMENTS

565101 3/1958 Belgium ...................... 156/195
424979 2/1926 Fed. Rep. of Germany .
1285802 12/1968 Fed. Rep. of Germany .
2439966 3/1975 Fed. Rep. of Germany ........ 174/47
20953 2/1900 Switzerland .

Primary Examiner—Laramie E. Askin
Attorney, Agent, or Firm—Lewis B. Sternfels

[57] ABSTRACT

The hose, which is particularly adapted for use with an electrically-driven vacuum cleaning apparatus, comprises a substantially air-tight, flexible tube which is pneumatically coupled between the vacuum pump and the suction head. The suction hose comprises one or more elongated strips which is or are helically wound into tubular form. In a pair of parallelly placed strips, the strip margin of the first strip is secured to an adjacent margin of the second strip at adjoining convolutions of the strips. Electrical conductors are carried by the strips within helically extending cavities formed at the edges or margins of each of the strips and are a portion of that means which electrically couples the cleaning brush to the electrical power supply.

64 Claims, 17 Drawing Figures

ELECTROMAGNETIC ENERGY-CARRYING TUBE AND FABRICATION METHOD THEREFOR, AND THE COMBINATION THEREOF WITH SUCTION CLEANING APPARATUS

BACKGROUND OF THE INVENTION

This is a continuation-in-part of copending application, Ser. No. 004,695, filed Jan. 19, 1979, now abandoned.

FIELD OF THE INVENTION

The present invention relates to a flexible tube in combination with an energy-carrying conductor or conductors which is or are preferably, but not exclusively, adapted for use as a suction hose in combination with electrically-driven vacuum cleaning apparatus.

DESCRIPTION OF THE PRIOR ART

While the present invention has particular use as a suction hose in combination with vacuum cleaning equipment, such as a conventional tank or canister-type vacuum cleaner, it is to be understood that its particular application will be limited only to the end needs of the ultimate user.

Hoses of this type are well-known in the art, as represented in the patent literature. Illustrations are exemplified in the following United States patents: electrical conductors extending generally parallel to the axis of the hose, as shown in U.S. Pat. Nos. 3,965,526 and 4,064,355; alternative designs of electrical conductors extending along the axis or spirally wound, but not used as structural support, as in U.S. Pat. Nos. 3,277,231 and 3,715,454; electrical conductors in single or parallel configuration extending in a spiral fashion along the hose and utilized additionally as a hose-reinforcing element, as in U.S. Pat. Nos. 2,890,264 and 3,917,499; and electrical conductors which may or may not act as reinforcing elements which are embedded or otherwise carried in convoluted strips which overlap in helical fashion to form the hose, as in U.S. Pat. Nos. 2,516,864; 2,695,631; and 3,273,600. While these hoses are presumed to work well for their intended purposes, they are illustrative of a very large number of designs that have been developed to overcome problems in the art.

Experience has indicated that the following problems exist in such prior art hoses. Wires which are used as structural supporting members in the hose, primarily to resist radial crushing thereof, generally are positioned in such a manner that they cause the hose to have undue wear, which considerably decreases the life span of the hose. When such support wires are also electrical conductors, e.g., see U.S. Pat. No. 3,917,499, one area of their insulation is held exposed by the unyielding support wire to the severest area of wear, cut, or puncture, thus opening electrically live conductors to the grasp of the human hand. Realizing such limitations, other hoses have been designed so that the wires are utilized solely for their current-carrying characteristics, and the hose is otherwise formed to obtain maximum support and wear resistance through other means. The result generally is a bulky profile, which lacks economy in the use of material. Even when these problems are overcome, manufacture of the hose is complicated in that the current-carrying conductors must be appropriately handled during formation of the hose or in other steps in its production. In addition, such production techniques may limit the number or type of conductors that are used.

A further limitation in prior art hose exists in rigid retention of the electric conductors in the hose. If a pin or other subject should puncture the hose adjacent the conductor, there is a large probability that the puncturing instrument will contact the conductor, because the conductor has no capability to be deflected and move within the hose.

SUMMARY OF THE INVENTION

The present invention avoids or overcomes these and other deficiencies, drawbacks or problems by providing for a simply manufactured hose having electromagnetic energy-carrying conductors therein. Briefly, the hose comprises a strip which is helically wound into a tubular form with one of the strip's margins secured to an adjacent margin at adjoining convolutions of the strips. At least one cavity is formed in one of the strip margins in which the electromagnetic energy-carrying conductor is carried. For a single strip, there may be double or triple conductors. For a plurality of strips extending helically in parallel, one conductor may be placed in each cavity. It is preferable that the wire be loosely held within the cavity; however, it is possible to extrude the profile with the wire therein. A preferred use of such a hose is in combination with vacuum cleaning apparatus.

It is, therefore, an object of the present invention to provide for a hose with energy-carrying conductors in which the conductors are not a primary contribution to the supporting structure of the hose.

Another object is to provide for maximum structural support of the hose profile commensurate with maximum flexibility thereof.

Another object is to provide for conductors which are designed solely for their energy-carrying characteristics without regard to the support of the structure so that the hose may be tailored to use of the best electrical conductors or other electromagnetic means carried by the hose.

Another object is to provide for a means by which the flow path of the electromagnetic current is separate from the flow path of fluid flowing through the hose.

Another object is to provide for protection of the conductors from abrasion and wear, as well as to increase the amount of insulation above the conductors.

Another object is to provide space in the hose to allow for rolling or sliding of the conductor to aid in avoiding puncture by pins and the like.

Another object is to provide for a multiple profile hose which permits the use of one or a multiple of conductors therein.

Another object is to provide for ease and efficiency of manufacture of such a hose.

Another object is to provide for such ease and economy of manufacture both in extruding the profile and in convoluting the hose.

Another object is the use of such a hose in combination with vacuum cleaning apparatus.

Other aims and objects, as well as a more complete understanding of the present invention, will appear from the following explanation of exemplary embodiments and the accompanying drawings thereof.

BRIEF DESCRIPTION OF THE DRAWINGS

FIG. 1 is a plan view of a cleaning apparatus equipped with the hose assembly of the present invention;

FIG. 4 is a modification of the hose strip depicted in FIG. 3;

DESCRIPTION OF THE PREFERRED EMBODIMENTS

Figures 1, 4, 5A:
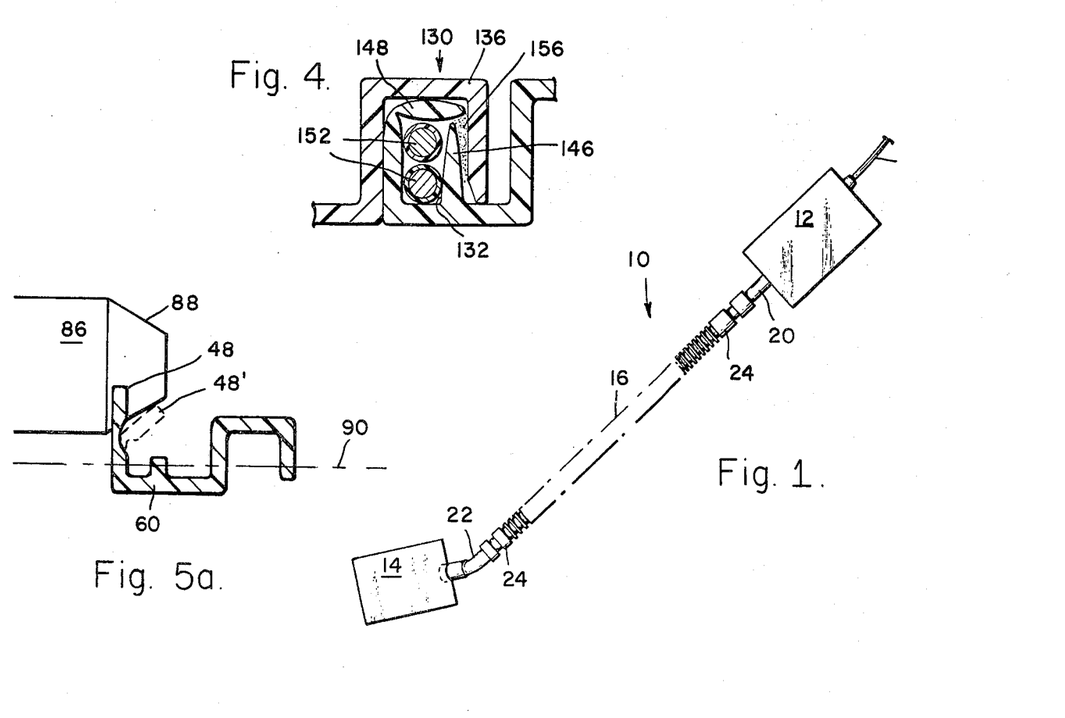

FIG. 1 depicts a preferred use of the present invention in which it comprises a component of a cleaning apparatus 10. As is conventional, cleaning apparatus 10 includes a vacuum pump housing or canister 12 communicating with a vacuum head 14 by means of a suction hose assembly 16. Canister 12 contains the vacuum pump with its drive motor, a vacuum chamber, a filter bag, controls and other components of a conventional vacuum cleaning device. The vacuum pump motor is connected to an electrical supply by a cord 18. Electrical wires from cord 18 extend into a conventional hose attachment with electrical socket 20, while a similarly conventional hose attachment with electrical socket 22 extends from vacuum head 14.

Figure 2:
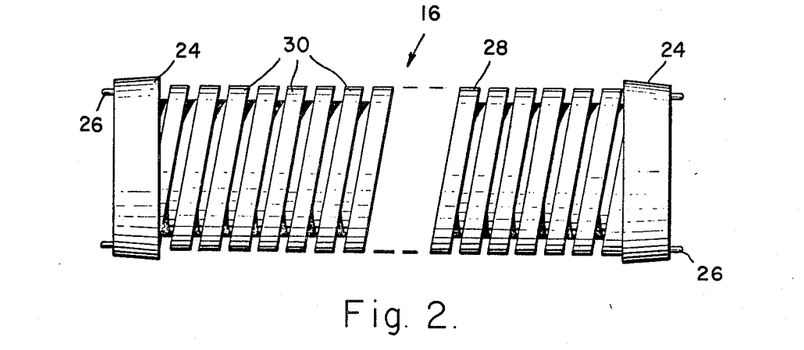
FIG. 2 is an enlarged plan view of the hose assembly depicted in FIG. 1.

As shown in FIG. 2, hose assembly 16 includes a pair of mating hose attachments 24 which mechanically connect to hose attachments and sockets 20 and 22. Electrical pins 26 or the equivalent in hose attachment 24 respectively are coupled to the electrical sockets included within hose attachments 20 and 22. Because canister 12, vacuum head 14, and the various hose attachments and electrical sockets are conventional in the art, further description thereof will be dispensed with, it being recognized that vacuum head 14 includes an electric motor for driving one or more brushes, beater bars or similar moving devices which are intended to facilitate movement of dirt from the surface to be cleaned into the suction head.

Hose assembly 16 further comprises a hose 28 having electrical or electromagnetic energy-carrying conductors therein. The hose comprises one or more strips 30 which are helically wound so that one strip margin is secured to an adjacent strip margin at adjoining convolutions.

Figure 3:
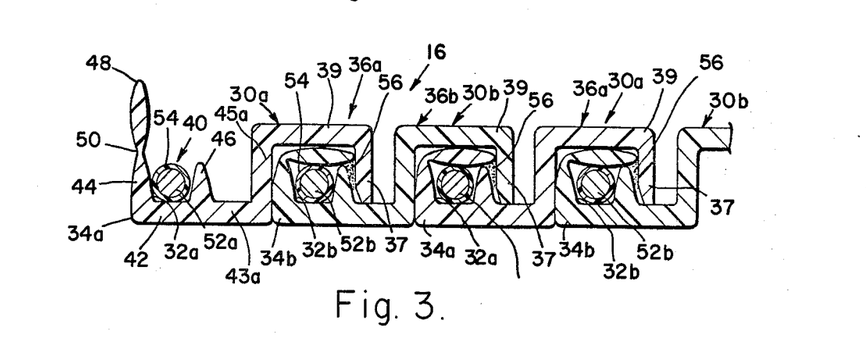
FIG. 3 is a cross-sectional view of a portion of the hose depicted in FIG. 2 showing how convoluted strips are interengaged to form a hose wall section, as well as to show how electrical conductors are carried in specially made cavities therein.

One such configuration is depicted in FIG. 3 which comprises a pair of strips 30a and 30b. Prior to convoluting of the strips into a hose, a strip 30a is secured to a strip 30b at their respective margins and, thereafter, the parallel strips are convoluted into the hose, as will hereinafter become better understood. The strips are preferably extruded to provide cavities 32a and 32b respectively at first strip margins 34a and 34b, and generally hook-shaped covers 36a and 36b respectively, defining the second strip margins of strips 30a and 30b.

All cavities are similarly formed and each comprises a generally U-shaped channel 40 having a base 42, a first side wall 44 extending from the base at the end of the strip edge, a second side wall 46 spaced from the first side wall and also extending from the base, and a top wall 48 hinged at 50 to first side wall 44. Hinge 50 generally comprises a necked-down portion of the strip which is formed during extrusion. As shown in FIG. 3, hinge 50 acts to facilitate bending of top wall 48 so that it will easily overlie and close channel 40 by coming into contact with second side wall 46. Both the bent and unbent configurations of top wall 48 are illustrated in FIG. 3.

Lying within respective cavities 32a and 32b are electrical conductors 52a and 52b. Bare wires may be placed within the cavities, if the strip material is of insulative material; however for double protection, wires 52a and 52b may have insulation material 54 thereon. Thus, any possible leakage of conductive fluid from the inside of hose 28 into cavity 40 will not result in a short circuit between wires or the carrying out of electric current to the human touch. In this respect, it is preferred that top wall 48 be bonded by a bonding agent 57 to second side wall 46, as well as to adjacent portions of hook-shaped covers 36a and 36b. The bonding material is preferably limited to the ends of walls 46 and 48 and the adjacent end leg portions 37 of covers 36a and 36b so that the hose will bend and flex much in the manner that is described in U.S. Pat. No. 3,255,780, whose principles of construction and flexibility are incorporated herein. Thus, those elements, for example of strip 30a in FIG. 3 identified by indicia 43a and 45a connecting base 42 with an intermediate leg portion 39, impart flexibility and support to hose assembly 16. Accordingly, elements 43a and 45a and leg portion 39 and their connecting hinge-like corners, including the corner between portions 37 and 39, may be termed flexible elements. Also, element 45a, portion 37 and walls 44 and 46 may be termed support elements in that they help to resist radially-exerted crushing forces on hose assembly 16. Equivalent elements appear in the embodiments of the remaining figures. Although not critical, any bonding material which may also adhere to intermediate leg portion 39 is not desired because it decreases flexibility of the hose.

It is further possible to utilize three or more strips, rather than those two which are depicted in FIG. 3, if it is necessary that there be more than two wires. For example, it may be necessary to utilize a third grounding wire as well as other wires which may be connected to an "on-off" switch. Therefore, it is to be understood that the concept of the present invention is not to be limited to use of a pair of strips but to one or more strips.

Furthermore, as shown in FIG. 4, a single strip 130 may be utilized in which a single large cavity 132 may incorporate a pair of wires 152 which, although shown as a pair of single wires, may be the conventional insulated double-wire configuration. Those double wires may be placed vertically, as shown, or horizontally and may include more than two conductors. In a like manner to that shown before, a bonding agent 156 secures together a top wall 148 and a second side wall 146, and the two walls to adjacent portions of a hook-shaped cover 136 in a manner similar to that discussed above with respect to FIG. 3. It is to be further understood, as a modification, that the single wire configuration of FIG. 3 may be combined with the double wire configuration of FIG. 4, utilizing a pair of parallelly extending strips.

If desired, wires 52a and 52b, and 152 may be extruded at the time strips 30 and 130 are formed.

Figures 5, 6, 7:
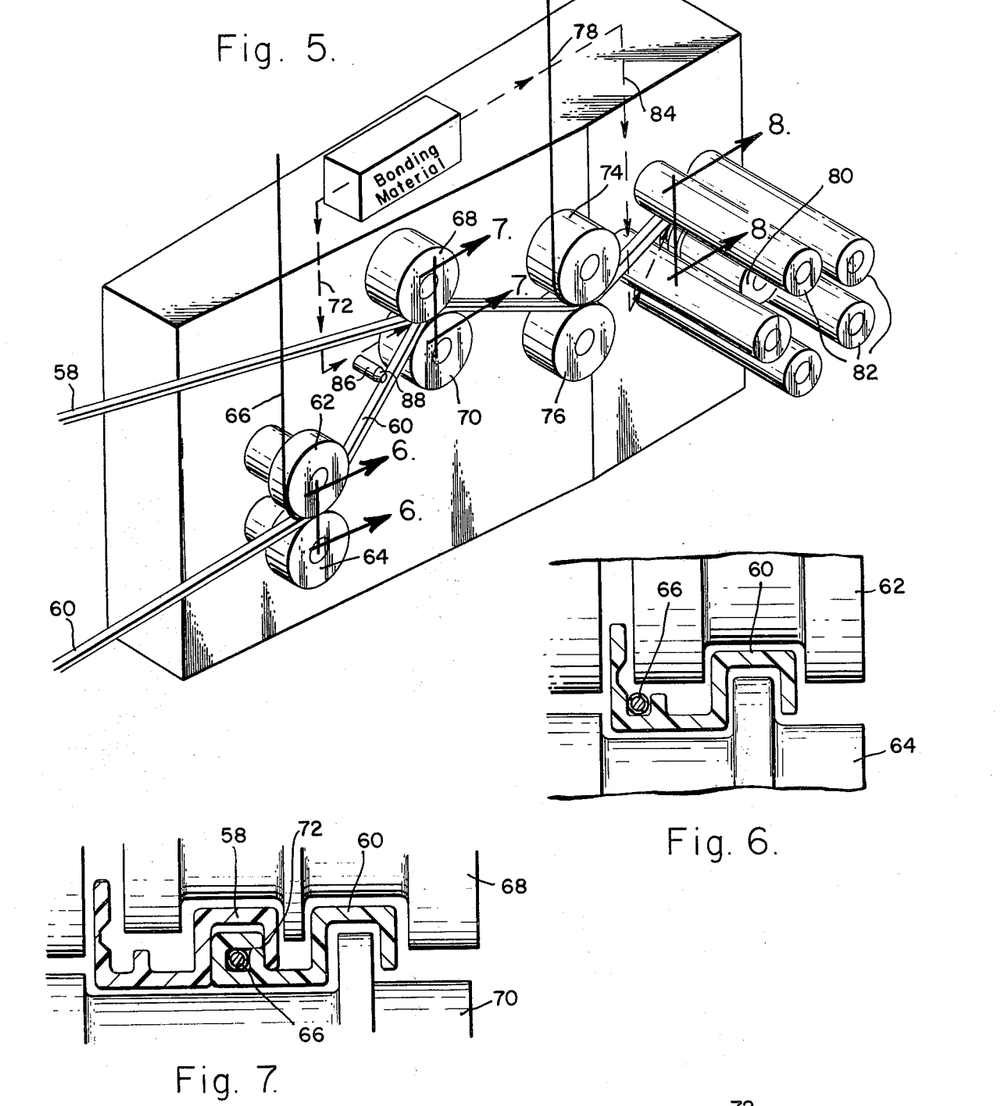
FIG. 5 illustrates the preferred machine and method for fabricating the hose depicted in FIGS. 2 and 3, with FIG. 5a being an enlargement of a part of the machine.
FIGS. 6 through 8 are cross-sectional views of steps in manufacturing the hose, taken along lines 6—6, 7—7, and 8—8, respectively, of FIG. 5.

The preferred method of forming the hose, such as shown in FIG. 3, is described with reference to FIGS. 5 through 8. This assembly is with reference to a pair of strips 58 and 60, each of which is formed by conventional extrusion operations. Strip 60 is fed between a pair of rollers 62 and 64 configured as shown in FIG. 6 to properly handle strip 60 as it passes therethrough. While passing through rollers 62 and 64, a wire 66 is also combined so that strip 60 with wire 66 therein approaches the next station at rollers 68 and 70.

At this point, strip 60 with its wire 66 therein is combined with strip 58. It is here that a first bonding agent 72 is applied to join a cavity margin of strip 60 with a hook-shaped cover of strip 58. The combination of strips 58 and 60 then proceeds to a further pair of rollers 74 and 76, which are configured similarly to rollers 68 and 70 and which permit insertion of a wire 78 therein.

Figure 8:
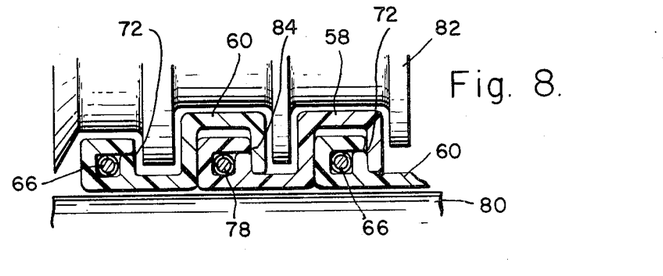

From rollers 74 and 76, strips 58 and 60 in parallel formation are convoluted upon themselves as they pass around a mandrel 80, guided by its several rollers 82. The rollers have a general shape or configuration as depicted in FIG. 8, but with a pitch that would permit parallelly formed strips 60 and 58 to be helically wound into tubular form, with one strip margin secured to an adjacent margin at adjoining convolutions. In addition, a further bonding material 84 is inserted between the hook-shaped margin of strip 60 and the cavity margin of strip 58.

It is an important aspect in the method of forming the hose that, as hose strips 58 and 60 are wrapped or convoluted into the desired hose shape, top walls 48 will naturally bend into closure with second side walls 46. A deflector 86 with angled end 88 (see FIG. 5a) and/or the shape of the rollers start or urge bending of the top walls in the proper closing direction, as illustrated by the phantom position 48' of the top wall. Such natural tendency of the top walls to bend occurs if hinge 50 is above the area center of gravity 90 of the strip.

While such a configuration of roller pairs 62 and 64, and 74 and 76, and mandrel-rollers 80 and 82 cooperate to form a hose configuration such as depicted in FIG. 3, it is obvious that other configurations of roller and mandrel-roller pairs are suitable for producing single strip hose configurations or hose configurations comprising three or more strips. It is to be understood, of course, that the pitch of the convolutions, for a given strip cross-sectional configuration, becomes flatter and less acutely angled to the axis of the hose. Since the number of strips used in parallel affects the flexibility of the hose, such considerations as number of strips and strip configurations should be taken into consideration when a hose of particular flexibility is desired.

Figure 9:
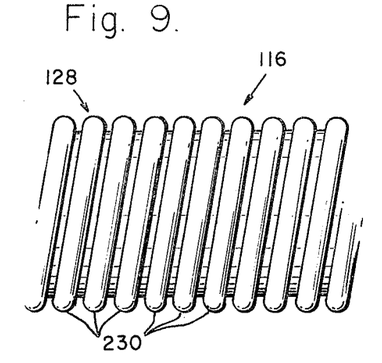
FIG. 9 is a plan view of another embodiment of the hose assembly usable in the cleaning apparatus depicted in FIG. 1.
Figure 16:
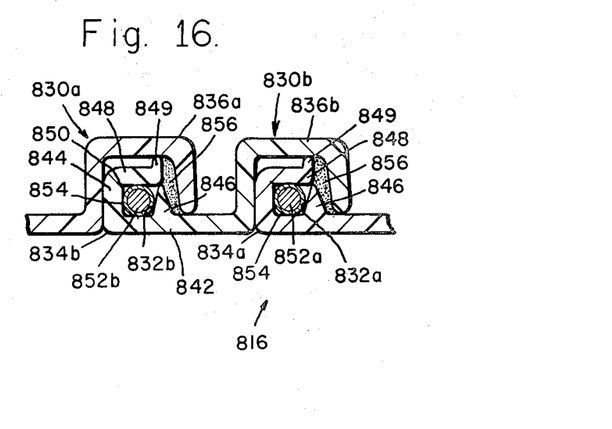
FIG. 16 is a cross-sectional view of a portion of a hose similar to that depicted in FIG. 10 but applied to the hose of FIG. 3.

A modified hose assembly 116 is shown in FIG. 9 having a rounded, rather than square appearance. It comprises a hose 128 having electrical or electromagnetic energy-carrying conductors therein. The hose comprises one or more strips 230, 330, 430, 530, 630, or 730 (see FIGS. 10-15) which are helically wound so that one strip margin is secured to an adjacent strip margin at adjoining convolutions. A similar strip 830 (FIG. 16) is squared which, therefore, will form the hose configuration shown in FIG. 2.

Figure 10:
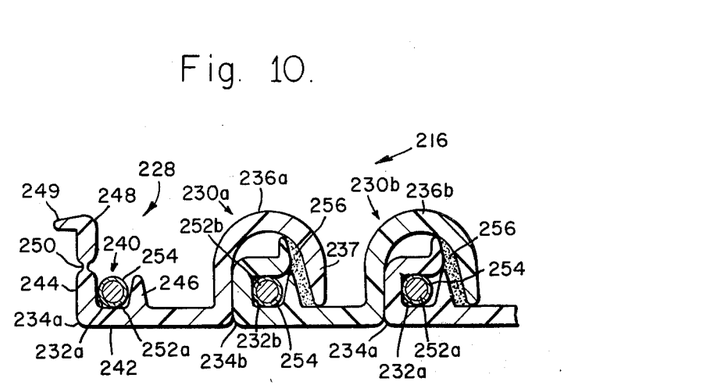
FIGS. 10-15 are cross-sectional views of portions of five embodiments of the hose illustrated in FIG. 9 showing how convoluted strips are interengaged to form hose wall sections with electrical conductors.
Figure 11:
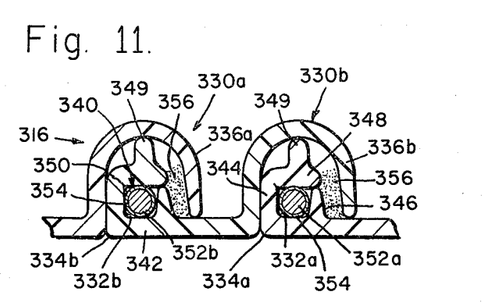
Figure 12:
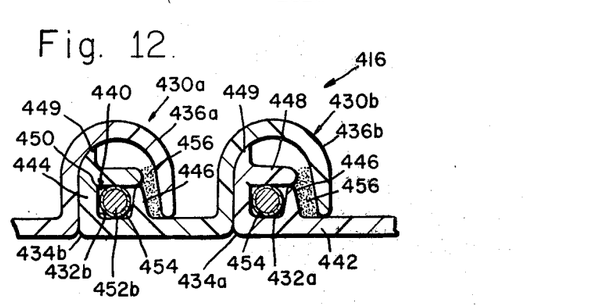
Figure 13:
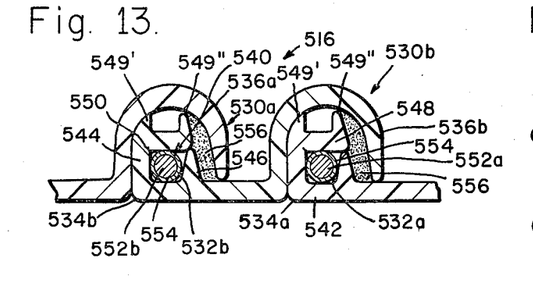
Figure 14:
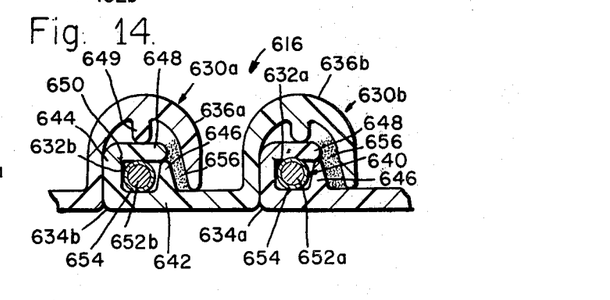
Figure 15:
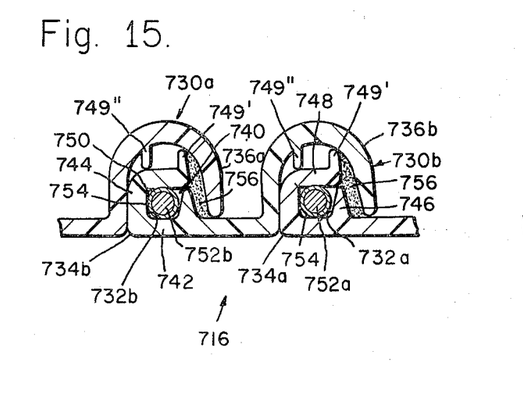

Several similar, but modified, configurations are depicted in FIGS. 10-15 which respectively comprise pairs of strips 230a and 230b, 330a and 330b, 430a and 430b, 530a and 530b, 630a and 630b, and 730a and 730b. Prior to convoluting of the strips into a hose, a strip 230a, 330a, etc., is secured to a strip 230b, etc., at their respective margins, and, thereafter, the parallel strips are convoluted into the hose, as previously described with respect to FIGS. 5-8. To avoid needless repetition, all references to numerals of the "200" series of FIG. 10 are understood to apply likewise to the "300" through "800" series of FIGS. 11-16.

The strips are preferably extruded to provide cavities 232a and 232b respectively at first strip margins 234a and 234b, and generally hook-shaped covers 236a and 236b defining second strip margins respectively of strips 230a and 230b.

All cavities are similarly formed and each comprises a generally U-shaped channel 240 having a base 242, a first side wall 244 extending from the base at the end of the strip edge, a second side wall 246 spaced from the first side wall and also extending from the base, and a top wall 248 hinged at 250 to first side wall 244. Hinge 250 generally comprises a necked-down portion of the strip which is formed during extrusion. As shown in FIG. 10 (as well as FIGS. 11-16) hinge 250 acts to facilitate bending of top wall 248 so that it will easily overlie and close channel 240 by coming into contact with second side wall 246. Both the bent and unbent configurations of top wall 248 are illustrated.

Especially where hook-shaped covers 236a and 236b are rounded as shown in FIGS. 10-15, pegs 249, 349, 449, 549' and 549", 649, 749' and 749", and 849 extend from one of hook-shaped covers or top walls or both, and towards and into contact with the opposing top or cover, to ensure that hook-shaped covers 236a and 236b, etc., are properly supported by and above wall 248, etc., and to maintain the desired external hose appearance. The particular position of the peg is not critical, and it further acts as a dam for containing bonding material 256, etc., as precisely as possible. The preferred location of the peg is illustrated in FIG. 10, to afford maximum flexibility to the hose.

The use of pegs not only keeps the wire chamber, formed by the U-shaped channel and the top wall, closed, but also is used to provide other important advantages. It or they reinforce the upper part of the hose crown defined by the hook-shaped covers, and it can keep the bonding material at a vertical edge.

Lying within the respective cavities 232a and 232b are electrical conductors 252a and 252b. Bare wires may be placed within the cavities, if the strip material is of insulative material; however for double protection, wires 252a and 252b may have insulation material 254 thereon. Thus, any possible leakage of conductive fluid from the inside of hose 228 into cavity 240 will not result in a short circuit between wires or the carrying out of electric current to the human touch. In this respect, it is preferred that top wall 248 be bonded by a bonding agent 256 to second side wall 246, as well as to adjacent portions of hook-shaped covers 236a and 236b. Depending upon the particular construction defined by the pegs, the bonding material is to a greater or lesser extent limited to the ends of walls 246 and 248 and the adjacent end leg portions 237 of covers 236a and 236b so that the hose will bend and flex much in the manner that is described in U.S. Pat. No. 3,255,780, whose principles of construction and flexibility are incorporated herein.

It is to be further understood that the specific designs of the channel or cavity of FIGS. 3, 4, and 10-16 are the preferred designs, and, if desired, it may not be necessary to utilize a top wall such as top wall 48, but to dispense with it. It also may not be necessary to retain one side wall 46, but use side wall 44 in combination with top wall 48, using additional bonding material to compensate for lack of the second side wall. Furthermore, other strip configurations, such as suggested in U.S. Pat. No. 3,255,780, may be utilized; see, particular, FIGS. 10 through 18 thereof with the electrical conductor being placed at or adjacent to the bonding locations of those configurations. As still another modification, the design depicted in copending U.S. patent application, Ser. No. 678,547, filed Apr. 20, 1976, may be used in lieu of the presently described design.

Although the invention has been described with reference to particular embodiments thereof, it should be realized that various changes and modifications may be made therein without department from the spirit and scope of the invention.

We claim:

1. In a combination of a flexible tube and electromagnetic energy-carrying means in which said tube comprises elongated strip means helically wound into tubular form, the improvement in which:
    said strip means includes first and second margins;
    said first strip margin comprises means which entirely overlaps and is secured to said second strip margin at adjoining convolutions of said strip means and which has at least partial independent movement with respect to said second strip margin, to form a secured-together margin structure which permits longitudinal flexing of said tube but resists radially-exerted crushing forces thereon; and
    said second strip margin comprises a structurally supporting helically extending, fully enclosing walled enclosure acting both as a conduit carrying said electromagnetic energy-carrying means and as an integral component of the secured-together margin structure.

2. A combination according to claim 1 in which said electromagnetic energy-carrying means are loosely carried in said walled enclosure for rolling and sliding movement therein.

3. A combination according to claim 2 in which said walled enclosure includes a generally U-shaped channel having a base and a pair of spaced side walls extending from said base.

4. A combination according to claim 1 in which said electromagnetic energy-carrying means are collectively carried in a single helically extending, fully enclosing walled enclosure.

5. A combination according to claim 1 in which said elongated strip means comprises a plurality of individual strips having a plurality of parallel and helically extending, fully enclosing walled enclosures in which individual ones of said electromagnetic energy-carrying means respectively extend.

6. A combination according to claims 4 or 5 in which said elongated strip means comprises electrical insulating material for protecting said electromagnetic energy-carrying means from electrical short circuits and from mechanical cutting, puncture and abrasion.

7. A combination according to claim 6 in which said electromagnetic energy-carrying means are jacketed in electrical insulation material for doubly protecting said electromagnetic energy-carrying means from the electrical short circuits and mechanical cutting, puncture and abrasion.

8. In a combination of a flexible tube and electromagnetic energy-carrying means in which said tube comprises elongated strip means helically wound into tubular form, the improvement in which:
    said strip means includes first and second margins separated by a flexible segment;
    said first strip margin comprises means which entirely overlaps and is secured to said second strip margin at adjoining convolutions of said strip means and which has at least partial independent movement with respect to said second strip margin, to form a secured-together margin structure which permits longitudinal flexing of said tube but resists radially-exerted crushing forces thereon; and
    said second strip margin comprises a structurally supporting walled enclosure defining helically extending cavity means acting both as a conduit carrying said electromagnetic energy-carrying means and as an integral component of the secured-together margin structure.

9. A combination according to claim 8, in which said electromagnetic energy-carrying means are loosely carried in said cavity means for rolling and sliding movement therein.

10. A combination according to claim 9 in which said cavity means includes a generally U-shaped channel having a base and a pair of spaced side walls extending from said base.

11. A combination according to claim 8 in which said electromagnetic energy-carrying means are collectively carried in a single helically extending cavity means.

12. A combination according to claim 8 in which said elongated strip means comprises a plurality of individual strips having a plurality of parallel and helically extending cavity means in which individual ones of said electromagnetic energy-carrying means respectively extend.

13. A combination according to claims 11 or 12 in which said elongated strip means comprises electrical insulation material for protecting said electromagnetic energy-carrying means from electrical short circuits and from mechanical cutting, puncture and abrasion.

14. A combination according to claim 13 in which said electromagnetic energy-carrying means are jacketed in electrical insulation material for doubly protecting said electromagnetic energy-carrying means from the electrical short circuits and mechanical cutting, puncture and abrasion.

15. A combination according to claim 8 in which said walled enclosure comprises walls which fully enclose said cavity means.

16. A combination according to claim 15 in which said cavity means includes a base, top wall spaced from said base, and a pair of spaced side walls secured to and extending between said base and said top wall.

17. A flexible tube in combination with electromagnetic energy-carrying means comprising:
    elongated strip means helically wound into tubular form with one strip margin secured to an adjacent margin at adjoining convolutions of said strip means;

helically extending cavity means in which said electromagnetic energy-carrying means are carried and which is positioned at a first edge of said strip means at least at one of said secured-together strip margins, and including a generally U-shaped channel having a base, a first side wall extending from said base at the end of said strip edge, a second side wall spaced from said first side wall and extending from said base, and a top wall hinged to said first side wall and extending towards and generally in contact with said second side wall for closing said channel;

adjoining strip material comprising a generally hook-shaped cover extending around and generally in contact with said pair of spaced side walls and said top wall; and material bonding said top wall to said second side wall for sealing said electromagnetic energy-carrying means within said cavity means and bonding at least said second side wall to said hook-shaped cover for securing and sealing said strip margins together in an air-tight manner while permitting facile bending of said tube.

18. A combination according to claim 17 in which said material is located only at portions of said hook-shaped cover which are adjacent to the bond between said second side wall and said top wall, for permitting unbonded portions of said hook-shaped cover to flex and to enhance flexibility of said tube.

19. A combination according to claim 18 in which at least one peg-like projection extends in contact between one of said top wall and said hook-shaped cover for assuring proper support of said hook-shaped cover by said top wall and for acting as a dam to precisely confine said bonding material adjacent said top wall, said second side wall and said hook-shaped cover portions.

20. A combination according to claim 17 in which said electromagnetic energy-carrying means are collectively carried in a single helically extending cavity means.

21. A combination according to claim 17 in which said elongated strip means comprises a plurality of individual strips having a plurality of parallel and helically extending cavity means in which individual ones of said electromagnetic energy-carrying means respectively extend.

22. A flexible tube in combination with electromagnetic energy-carrying means comprising elongated strip means helically wound into tubular form with one strip margin secured to an adjacent margin at adjoining convolutions of said strip means, characterized in that:

at least one of said secured-together strip margins defines helically extending cavity means in which said electromagnetic energy-carrying means are loosely carried for rolling and sliding movement therein; and said cavity means includes a generally U-shaped channel having a base, a pair of spaced side walls extending from said base, and a top wall secured to one of said side walls by a hinge and extending towards the other of said side walls for closing said channel.

23. A combination according to claim 22 in which at least one peg-like projection extends in contact between one of said top wall and said other of said secured-together strip margins for assuring proper support of said other of said secured-together strip margins by said top wall.

24. A combination according to claim 23 in which said peg-like projection is placed at or adjacent to one end of said top wall and extends therefrom into contact with said other of said secured-together strip margins.

25. A combination according to claim 24 in which a second peg-like projection extends from said other of said secured-together strip margins into contact with said top wall.

26. A combination according to claim 23 in which a pair of said peg-like projections are placed at both ends of said top wall and extend therefrom into contact with said other of said secured-together strip margins.

27. A combination according to claim 23 in which said peg-like projection extends from said other of said secured-together strip margins into contact with said top wall.

28. A combination according to claim 23 in which bonding material secures said top wall, said other of said side walls and said other of said secured-together strip margins to each other, said peg-like projection forming a dam for precisely confining said bonding material to a selected area.

29. A combination according to claim 22 in which said hinge comprises a portion which is thinner than other portions of said strip.

30. A method for fabricating a flexible tube in combination with at least two electromagnetic energy-carrying conductors comprising the steps of:

forming as many elongated strips as there are conductors or multiples thereof, each of the strips having first and second margins which define components of a crush-resistant, flexible tube structure with at least one cavity means at a first margin thereof;

inserting a first pliable electromagnetic energy-carrying conductor into the cavity means of a first of the strips;

closing the first strip cavity means with the first conductor enclosed therein;

securing the second margin of a second of the strips to the closed cavity means of the first strip;

inserting a second pliable electromagnetic energy-carrying conductor into the cavity means of the second strip;

closing the second strip cavity means with the second conductor enclosed therein;

repeating said inserting and closing steps in seriatim for any further conductors and strips; and helically winding the strips in parallel formation and securing the second margin of the first strip to the closed cavity means of the last strip at adjoining convolutions of the parallelly-formed strips to form the crush-resistant, flexible structure.

31. A method according to claim 30 wherein said inserting steps comprise loosely placing the electromagnetic energy-carrying conductors into the cavity means.

32. A method according to claim 31 further comprising the respective steps of simultaneously affixing closure of the first strip cavity means during said last strip second margin securing step, and of simultaneously affixing closure of the last strip cavity means during said first strip second margin securing step.

33. A method according to claim 32 wherein both said simultaneously effected affixing and securing steps respectively comprise the step of sealing the cavity means and the margins together with a bonding agent.

34. A method for fabricating a flexible tube in combination with electromagnetic energy-carrying means comprising the steps of:

forming elongated strip means with at least one open cavity means therein at a first margin thereof;

forming the cavity means as a generally U-shaped channel having a base, a first side wall extending from the base at the margin edge, a second side wall spaced from the first side wall and extending from the base, and a top wall hinged to the first side wall and extending towards and generally in contact with the second side wall for closing the channel;

forming the second margin as a generally hook-shaped cover;

inserting electromagnetic energy-carrying means into the open cavity means;

closing the cavity means;

helically winding the strip means upon itself and extending the hook-shaped cover around and generally in contact with the pair of spaced side walls and the top wall; and securing the first strip margin to a second strip margin at adjoining convolutions of the strip means by bonding the top wall to the second side wall for sealing the cavity means, and at least the second side wall to the hook-shaped cover for securing and sealing the strip margins together in an air-tight manner while permitting operational handling of the tube.

35. A method according to claim 34 wherein one of said cavity means and second margin forming steps further comprises the step of:

forming at least one peg-like projection means on one of the top walls and the hook-shaped cover so that the projection means extends in contact therebetween, supports the hook-shaped cover on and above the top wall, and acts as a dam to precisely confine the bonding material adjacent the top wall, the second side wall and the hook-shaped cover.

36. A method according to claim 34 further comprising the step of causing the top wall to extend to and generally in contact with the second side wall by placing the hinged connection between the top wall and the side wall above each strip's area center of gravity.

37. A method for fabricating a flexible tube in combination with electromagnetic energy-carrying means comprising the steps of:

forming elongated strip means with first and second margins thereof forming components of a radially-directed crush-resistant, flexible structure and with at least one open cavity means at the first margin thereof;

inserting the electromagnetic energy-carrying means into the open cavity means;

closing the cavity means; and helically winding the strip means upon itself and securing the first strip margin to the second strip margin at adjoining convolutions of the strip means to form the crush-resistant, flexible structure.

38. A method according to claim 37 wherein said inserting step comprises loosely placing the electromagnetic energy-carrying means into the cavity means.

39. A method according to claim 37 further comprising the step of simultaneously affixing closure of the cavity means during said margin securing step.

40. A method according to claim 39 wherein said simultaneously effected affixing and securing steps comprises the step of sealing the cavity means and the margins together with a bonding agent.

41. A method for fabricating a flexible tube in combination with electromagnetic energy-carrying means comprising the steps of:

forming elongated strip means having a top wall, a hinge securing the top wall to the strip means and placed above the area center of gravity of the strip means, and at least one cavity means with an opening therein at a first margin of the strip means;

inserting electromagnetic energy-carrying means into the cavity means opening;

closing the cavity means by bending the top wall about the hinge to close the opening in the cavity means; and helically winding the strip means upon itself and securing the first strip margin to a second strip margin at adjoining convolutions of the strip means.

42. A method for fabricating a flexible tube in combination with at least two electromagnetic energy-carrying conductors comprising the steps of:

forming as many elongated strips as there are conductors or multiples thereof, each of the strips having first and second margins and having at least one cavity means at a first margin thereof;

forming the cavity means as a generally U-shaped channel having a base, a first side wall extending from the base at the margin edge, a second side wall spaced from the first side wall and extending from the base, and a top wall hinged to the first side wall and extending towards and generally in contact with the second side wall for closing the channel;

forming the second margin as a generally hook-shaped cover;

inserting a first electromagnetic energy-carrying conductor into the cavity means of a first of the strips;

closing the first strip cavity means with the first conductor enclosed therein;

securing the second margin of a second of the strips to the closed cavity means of the first strip;

inserting a second electromagnetic energy-carrying conductor into the cavity means of the second strip;

closing the second strip cavity means with the second conductor enclosed therein;

repeating said inserting and closing steps in seriatim for any further conductors and strips;

helically winding the strips in parallel formation and extending the hook-shaped cover around and generally in contact with the pair of spaced side walls and the top wall; and securing the second margin of the first strip to the closed cavity means of the last strip at adjoining convolutions of the parallelly formed strips by bonding the top wall to the second side wall for sealing the cavity means, and at least the second side wall to the hook-shaped cover for securing and sealing the strip margins together in an air-tight manner while permitting operational handling of the tube.

43. A method for fabricating a flexible tube in combination with at least two electromagnetic energy-carrying conductors comprising the steps of:

forming as many elongated strips as there are conductors or multiples thereof, each of the strips having first and second margins, a top wall, and a hinge securing the top wall to the strip means and placed above each strip's area center of gravity, and having at least one cavity means with an opening therein at a first margin of each strip;

inserting a first electromagnetic energy-carrying conductor into the cavity means of a first of the strips;

closing the first strip cavity means with the first conductor enclosed therein by bending the top wall about the hinge to close the opening in the cavity means;

securing the second margin of a second of the strips to the closed cavity means of the first strip;

inserting a second electromagnetic energy-carrying conductor into the cavity means of the second strip;

closing the second strip cavity means with the second conductor enclosed therein by bending the top wall about the hinge to close the opening in the cavity means;

repeating said inserting and closing steps in seriatim for any further conductors and strips; and helically winding the strips in parallel formation and securing the second margin of the first strip to the closed cavity means of the last strip at adjoining convolutions of the parallelly formed strips.

44. In a combination of a suction hose defined as a tube with electrical conductors, and a cleaning apparatus having an electrically-driven vacuum pump coupled to a power supply and a separate suction head with electrically actuated cleaning brush means, in which said tube is substantially air-tight and flexible and is pneumatically coupled between said vacuum pump and said suction head and in which said electrical conductors electrically couple said cleaning brush means to said power supply, the improvement in said suction hose comprising:

elongated strip means having a pair of margins with flexible and support elements separated by a flexible central segment and helically wound into tubular form, one of said strip margins enclosing and being secured to an adjacent one of said margins at adjoining convolutions of said strip means to form a secured-together margin structure in which said flexible and support elements are capable of at least partial independent movement and, together with said flexible central segment, permit longitudinal flexing of said tube and in which said support elements resist radially-exerted crushing forces on said tube, and said adjacent one of said secured-together strip margins, including said support elements, comprising a structurally supporting closed wall enclosure defining helically extending fully enclosed cavity means acting both as a conduit carrying said electrical conductors and as an integral component of said secured-together margin structure.

45. A combination according to claim 44 in which said electrical conductors are loosely carried in said cavity means for rolling and sliding movement therein.

46. A combination according to claim 44 in which said cavity means includes a generally U-shaped channel having a base and a pair of spaced side walls extending from said base.

47. A combination according to claim 44 in which said electrical conductors are collectively carried in a single helically extending cavity means.

48. A combination according to claim 44 in which said elongated strip means comprises a plurality of individual strips having a plurality of parallel and helically extending cavity means in which individual ones of said electrical conductors respectively extend.

49. A combination according to claims 47 or 48 in which said elongated strip means comprises electrical insulation material for protecting said electrical conductors from electrical short circuits with other conductors and from mechanical cutting, puncture and abrasion.

50. A combination according to claim 49 in which said electrical conductors are jacketed in electrical insulation material for doubly protecting said electrical conductors from the electrical short circuits and from the cutting, puncture and mechanical abrasion.

51. A combination according to claim 44 in which said cavity means includes a base, a top wall spaced from said base, and a pair of spaced side walls secured to and extending between said base and said top wall.

52. In a combination of a suction hose defined as a tube with electrical conductors, and a cleaning apparatus having an electrically-driven vacuum pump coupled to a power supply and a separate suction head with electrically actuated cleaning brush means, in which said tube is substantially air-tight and flexible and is pneumatically coupled between said vacuum pump and said suction head and in which said electrical conductors electrically couple said cleaning brush means to said power supply, the improvement in which said suction hose comprises:

elongated strip means helically wound into tubular form with one strip margin secured to an adjacent margin at adjoining convolutions of said strip means, with at least one of said secured-together strip margins defining helically extending cavity means in which said electrical conductors are carried, said cavity means including a generally U-shaped channel having a base, a pair of spaced side walls extending from said base, and a top wall which is secured to one of said side walls by a hinge and which extends towards the other of said side walls for closing said channel.

53. A combination according to claim 52 in which said hinge comprises a portion which is thinner than other portions of said strip.

54. A combination according to claim 52 in which at least one peg-like projection extends in contact between one of said top wall and said other of said secured-together strip margins for assuring proper support of said other of said secured-together strip margins by said top wall.

55. A combination according to claim 54 in which said peg-like projection is placed at or adjacent to one end of said top wall and extends therefrom into contact with said other of said secured-together strip margins.

56. A combination according to claim 55 in which a second peg-like projection extends from said other of said secured-together strip margins into contact with said top wall.

57. A combination according to claim 54 in which a pair of said peg-like projections are placed at both ends of said top wall and extend therefrom into contact with said other of said secured-together strip margins.

58. A combination according to claim 54 in which said peg-like projection extends from said other of said secured-together strip margins into contact with said top wall.

59. A combination according to claim 54 in which bonding material secures said top wall, said other of said side walls and said other of said secured-together strip margins to each other, said peg-like projection forming a dam for precisely confining said bonding material to a selected area.

60. In a combination of a suction hose defined as a tube with electrical conductors, and a cleaning apparatus having an electrically-driven vacuum pump coupled to a power supply and a separate suction head with electrically actuated cleaning brush means, in which said tube is substantially air-tight and flexible and is pneumatically coupled between said vacuum pump and said suction head and in which said electrical conductors electrically couple said cleaning brush means to said power supply, the improvement in which said suction hose comprises: elongated strip means helically wound into tubular form with one strip margin secured to an adjacent margin at adjoining convolutions of said strip means, at least one of said secured-together strip margins defining helically extending cavity means in which said electrical conductors are carried, said cavity means being positioned at a first edge of said strip means and including a generally U-shaped channel having a base, a first side wall extending from said base at the end of said strip edge, a second side wall spaced from said first side wall and extending from said base, and a top wall hinged to said first side wall and extending towards and generally in contact with said second side wall for closing said channel, an adjoining strip margin comprising a generally hook-shaped cover extending around and generally in contact with said pair of spaced side walls and said top wall, and material bonding said top wall to said second side wall for sealing said electrical conductors within said cavity means and for bonding at least said second side wall to said hook-shaped cover to secure and seal said strip margins together in an airtight manner while permitting facile bending of said tube.

61. A combination according to claim 60 in which said material is located only at portions of said hook-shaped cover which are adjacent to the bond between said second side wall and said top wall, for permitting unbonded portions of said hook-shaped cover to flex and to enhance flexibility of said suction hose.

62. A combination according to claim 61 in which at least one peg-like projection extends in contact between one of said top wall and said hook-shaped cover for assuring proper support of said hook-shaped cover by said top wall and for acting as a dam to precisely confine said bonding material adjacent said top wall, said second side wall and said hook-shaped cover portions.

63. A combination according to claim 60 in which said electrical conductors are collectively carried in a single helically extending cavity means.

64. A combination according to claim 60 in which said elongated strip means comprises a plurality of individual strips having a plurality of parallel and helically extending cavity means in which individual ones of said electrical conductors respectively extend.

* * * * *